(12) United States Patent
Chae et al.

(10) Patent No.: US 11,508,953 B2
(45) Date of Patent: Nov. 22, 2022

(54) NEGATIVE ELECTRODE FOR LITHIUM SECONDARY BATTERY, LITHIUM SECONDARY BATTERY COMPRISING THE SAME, AND METHOD OF PREPARING THE NEGATIVE ELECTRODE

(71) Applicant: LG CHEM, LTD., Seoul (KR)

(72) Inventors: Oh Byong Chae, Daejeon (KR); Yoon Ah Kang, Daejeon (KR); Jun Hyuk Song, Daejeon (KR); Eun Kyung Kim, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 215 days.

(21) Appl. No.: 16/478,675

(22) PCT Filed: Apr. 17, 2018

(86) PCT No.: PCT/KR2018/004444
§ 371 (c)(1),
(2) Date: Jul. 17, 2019

(87) PCT Pub. No.: WO2018/194345
PCT Pub. Date: Oct. 25, 2018

(65) Prior Publication Data
US 2019/0372096 A1 Dec. 5, 2019

(30) Foreign Application Priority Data

Apr. 19, 2017 (KR) .................. 10-2017-0050643

(51) Int. Cl.
| | | |
|---|---|---|
| *H01M 4/134* | (2010.01) | |
| *H01M 4/04* | (2006.01) | |
| *H01M 4/131* | (2010.01) | |
| *H01M 4/1391* | (2010.01) | |
| *H01M 4/1395* | (2010.01) | |
| *H01M 4/38* | (2006.01) | |
| *H01M 10/0525* | (2010.01) | |
| *H01M 4/02* | (2006.01) | |

(52) U.S. Cl.
CPC ......... *H01M 4/134* (2013.01); *H01M 4/0423* (2013.01); *H01M 4/0428* (2013.01); *H01M 4/131* (2013.01); *H01M 4/1391* (2013.01); *H01M 4/1395* (2013.01); *H01M 4/38* (2013.01); *H01M 10/0525* (2013.01); *H01M 2004/027* (2013.01)

(58) Field of Classification Search
CPC .... H01M 4/131; H01M 4/134; H01M 4/1391; H01M 2004/027
See application file for complete search history.

(56) References Cited

U.S. PATENT DOCUMENTS

| | | | | |
|---|---|---|---|---|
| 2003/0054249 | A1* | 3/2003 | Yamamoto | ............ H01M 4/485 429/231.1 |
| 2004/0175261 | A1 | 9/2004 | Casaro | |
| 2004/0175621 | A1* | 9/2004 | Iriyama | ................... H01M 4/36 429/231.95 |
| 2015/0280227 | A1 | 10/2015 | He et al. | |
| 2015/0357628 | A1* | 12/2015 | Li | ........................ H01M 4/1395 252/182.1 |
| 2016/0141608 | A1 | 5/2016 | Ryu et al. | |

FOREIGN PATENT DOCUMENTS

| | | |
|---|---|---|
| JP | 2003-162997 A | 6/2003 |
| JP | 2007-273459 A | 10/2007 |
| JP | 4192462 B2 | 12/2008 |
| JP | 2011-249046 A | 12/2011 |
| KR | 10-2009-0076275 A | 7/2009 |
| KR | 10-2013-0140395 A | 12/2013 |
| KR | 10-2014-0046496 A | 4/2014 |
| KR | 10-2016-0040020 A | 4/2016 |
| KR | 10-2016-0057813 A | 5/2016 |

OTHER PUBLICATIONS

JP2007273459A English machine translation (Year: 2021).*
Partial Supplementary European Search Report for European Application No. 18788342.6, dated Feb. 25, 2020.
Extended European Search Report, dated Jun. 18, 2020, for European Application No. 18788342.6.
International Search Report for PCT/KR2018/004444 (PCT/ISA/210) dated Aug. 1, 2018, with English translation.

* cited by examiner

*Primary Examiner* — Ula C Ruddock
*Assistant Examiner* — Armindo Carvalho, Jr.
(74) *Attorney, Agent, or Firm* — Birch, Stewart, Kolasch & Birch, LLP

(57) ABSTRACT

A negative electrode for a lithium secondary battery, which includes a negative electrode active material layer formed on a negative electrode collector, and a coating layer formed on the negative electrode active material layer and which includes lithium metal and metal oxide, a lithium secondary battery including the same, and a method of preparing the negative electrode.

5 Claims, No Drawings

NEGATIVE ELECTRODE FOR LITHIUM SECONDARY BATTERY, LITHIUM SECONDARY BATTERY COMPRISING THE SAME, AND METHOD OF PREPARING THE NEGATIVE ELECTRODE

CROSS-REFERENCE TO RELATED APPLICATIONS

This application claims the benefit of Korean Patent Application No. 10-2017-0050643, filed on Apr. 19, 2017, in the Korean Intellectual Property Office, the disclosure of which is incorporated herein in its entirety by reference.

TECHNICAL FIELD

The present invention relates to a negative electrode for a lithium secondary battery, a lithium secondary battery comprising the same, and a method of preparing the negative electrode, and more particularly, to a negative electrode for a lithium secondary battery in which a coating layer comprising lithium metal and metal oxide is formed on a negative electrode active material layer, a lithium secondary battery comprising the negative electrode, and a method of preparing the negative electrode.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

A metal oxide, such as $LiCoO_2$, $LiMnO_2$, $LiMn_2O_4$, or $LiCrO_2$, is being used as a positive electrode active material constituting a positive electrode of a lithium secondary battery, and metallic lithium, a carbon-based material, such as graphite or activated carbon, or a material, such as silicon oxide ($SiOx$), is being used as a negative electrode active material constituting a negative electrode. Among these negative electrode active materials, the metallic lithium has initially been mainly used, but, recently, the carbon-based material has been mainly used, because a phenomenon occurs in which the battery is destroyed by damage of a separator which is caused by the growth of lithium atoms on the surface of the metal lithium as charge and discharge cycles proceed. However, with respect to the carbon-based material, it is disadvantageous in that its capacity is small because its theoretical capacity is only about 400 mAh/g, and thus, various studies have been conducted to replace the carbon-based material by using silicon (Si) with high theoretical capacity (4,200 mAh/g) as a negative electrode active material.

Charge and discharge of the lithium secondary battery is performed while a process of intercalating and deintercalating lithium ions from the positive electrode active material of the positive electrode into and out of the negative electrode active material of the negative electrode is repeated.

Theoretically, lithium intercalation and deintercalation reactions in the negative electrode active material are completely reversible, but, actually, more lithium is consumed than theoretical capacity of the negative electrode active material, and only a portion of the lithium is recovered during discharge. Thus, after a second cycle, a smaller amount of lithium ions is intercalated during charge, but most of the intercalated lithium ions are deintercalated during discharge. Thus, a difference in capacity between the first charge and discharge reactions is referred to as an irreversible capacity loss, and, since a commercially available lithium secondary battery is prepared in a state in which lithium ions are supplied from the positive electrode and lithium is not present in the negative electrode, it is important to minimize the irreversible capacity loss during initial charge and discharge.

It is known that this initial irreversible capacity loss is mainly caused by an electrolyte decomposition reaction on a surface of the negative electrode active material, and an SEI (Solid Electrolyte Interface) is formed on the surface of the negative electrode active material by an electrochemical reaction due to the electrolyte decomposition. Since a large amount of lithium ions is consumed in the formation of the SEI, there is a limitation in that the irreversible capacity loss is caused, but the SEI formed at an initial stage of charging may prevent a reaction of the lithium ions with the negative electrode or other materials during charge and discharge and may act as an ion tunnel that only passes the lithium ions, and thus, the SEI contributes to the improvement of cycle characteristics of the lithium secondary battery by suppressing the further electrolyte decomposition reaction.

Therefore, there is a need for a method to improve the initial irreversibility caused by the formation of the SEI, and one of such methods comprises a method of allowing a side reaction generated during the first charge to occur in advance by performing pre-lithiation before the preparation of the lithium secondary battery. As described above, in a case in which the pre-lithiation is performed, when the actually prepared secondary battery is charged and discharged, since the first cycle is performed in a state in which the irreversibility is reduced accordingly, it is advantageous in that the initial irreversibility may be reduced.

Accordingly, there is a need to develop a new negative electrode for a secondary battery, in which more effective pre-lithiation may be performed, a method of preparing the same, and a method of preparing a secondary battery.

DISCLOSURE OF THE INVENTION

Technical Problem

An aspect of the present invention provides a negative electrode for a lithium secondary battery in which pre-lithiation may be effectively performed.

Another aspect of the present invention provides a method of preparing the negative electrode for a lithium secondary battery.

Another aspect of the present invention provides a lithium secondary battery comprising the negative electrode for a lithium secondary battery.

Technical Solution

According to an aspect of the present invention, there is provided a negative electrode for a lithium secondary battery comprising: a negative electrode active material layer formed on a negative electrode collector; and a coating layer formed on the negative electrode active material layer and which comprises lithium metal and metal oxide.

According to another aspect of the present invention, there is provided a method of preparing the negative electrode for a lithium secondary battery which comprises the steps of: (1) forming a negative electrode active material layer on a negative electrode collector; and (2) forming a coating layer comprising lithium metal and metal oxide on the negative electrode active material layer.

According to another aspect of the present invention, there is provided a lithium secondary battery comprising the negative electrode for a lithium secondary battery.

Advantageous Effects

Since pre-lithiation may be effectively performed on a negative electrode for a lithium secondary battery according to the present invention, irreversible capacity is reduced, and thus, high capacity characteristics may be exhibited.

BEST MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A negative electrode for a lithium secondary battery according to the present invention comprises a negative electrode active material layer formed on a negative electrode collector; and a coating layer formed on the negative electrode active material layer and which comprises lithium metal and metal oxide.

In the negative electrode for a lithium secondary battery according to an embodiment of the present invention, the negative electrode active material may comprise a silicon-based negative electrode active material. The silicon-based negative electrode active material, for example, may comprise at least one selected from the group consisting of silicon (Si), silicon oxide particles ($SiO_x$, $0<x2$), a Si-metal alloy, and an alloy of Si and silicon oxide particles ($SiO_x$, $0<x2$), and the silicon oxide particles may be a composite ($SiO_x$, $0<x2$) composed of crystalline $SiO_2$ and amorphous Si.

Since the silicon-based negative electrode active material undergoes a large volume change during charge and discharge and has a large irreversible capacity due to severe surface side effects during initial charge and discharge, benefits obtained by performing pre-lithiation are greater.

Also, in addition to the silicon-based negative electrode active material, the negative electrode active material may typically comprise a carbon material capable of intercalating and deintercalating lithium ions, lithium metal, or tin together. Both low crystalline carbon and high crystalline carbon may be used as the carbon material, typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

In the negative electrode for a lithium secondary battery according to the embodiment of the present invention, the negative electrode active material layer may have a thickness of 10 μm to 100 μm and may specifically have a thickness of 50 μm to 80 μm.

The coating layer comprising lithium metal and metal oxide may be formed in the form of a thin layer on the negative electrode active material layer.

In the negative electrode for a lithium secondary battery according to the embodiment of the present invention, the coating layer may be in the form of a single layer in which the lithium metal and the metal oxide are mixed.

Since the lithium metal included in the coating layer may supply lithium ions to the negative active material layer, it is possible to compensate for the reduction of lithium ions generated by initial irreversibility of the lithium secondary battery comprising the same. The lithium metal may be completely consumed in an initial activation charge process of the lithium secondary battery comprising the same.

The metal oxide may exhibit an effect of preventing oxidation of the lithium metal which is easily oxidized when exposed to moisture and oxygen and has an effect of increasing safety of the lithium secondary battery.

The coating layer may have a thickness of 1,000 nm to 7,500 nm and may specifically have a thickness of 1,500 nm to 5,000 nm.

In a case in which the coating layer satisfies the above thickness range, the metal oxide, which remains on the negative electrode active material layer after the initial charge and discharge of the lithium secondary battery comprising the negative electrode for a lithium secondary battery, may form a layer having a certain thickness while the coating layer may comprise the lithium metal in an amount capable of compensating for the irreversibility of the negative electrode for a lithium secondary battery.

The lithium metal and the metal oxide may have a weight ratio of 50:50 to 99:1 and may specifically have a weight ratio of 80:20 to 95:5.

In a case in which the lithium metal and the metal oxide satisfies the above weight ratio, the metal oxide may have the effect of preventing the oxidation of the lithium metal while the coating layer may comprise the lithium metal in an amount capable of appropriately compensating for the irreversibility of the negative electrode for a lithium secondary battery within the thickness range.

In the negative electrode for a lithium secondary battery according to another embodiment of the present invention, the coating layer may be in a form in which a first layer comprising the lithium metal is formed on the negative electrode active material layer and a second layer comprising the metal oxide is formed on the first layer. That is, the coating layer may be a laminate in which the first layer comprising lithium metal is formed on the negative electrode active material layer and the second layer comprising metal oxide is formed on the first layer.

The first layer may have a thickness of 1,000 nm to 7,000 nm and may specifically have a thickness of 1,500 nm to 5,000 nm.

In a case in which the first layer is formed on the negative electrode active material layer within the above thickness range, the first layer may comprise the lithium metal in an appropriate amount capable of compensating for the irreversibility of the negative electrode for a lithium secondary battery.

The second layer may have a thickness of 1 nm to 100 nm and may specifically have a thickness of 10 nm to 50 nm.

In a case in which the second layer has the above thickness range, the second layer may have the effect of preventing the oxidation of the lithium metal, may suppress breakage or exfoliation of the negative electrode active material layer due to the volume change during charge and discharge of the negative electrode active material included in the negative electrode active material layer, and may improve mechanical strength of the negative electrode active material layer.

The metal oxide may comprise at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, iron oxide, manganese oxide, vanadium oxide, cobalt oxide, nickel oxide, and tantalum pentoxide, and may specifically comprise at least one selected from the group consisting of aluminum oxide, chromium trioxide, zirconium dioxide, and tantalum pentoxide.

Furthermore, the present invention provides a method of preparing the negative electrode for a lithium secondary battery.

The method of preparing the negative electrode for a lithium secondary battery of the present invention comprises the steps of: (1) forming a negative electrode active material layer on a negative electrode collector; and (2) forming a coating layer comprising lithium metal and metal oxide on the negative electrode active material layer.

In step (1), a negative electrode active material layer comprising a carbon-based active material is formed on a negative electrode collector as in a conventional method. For example, the negative electrode may be prepared according to the method of forming the negative electrode active material layer on the negative electrode collector in which, after a slurry is prepared by mixing and stirring the negative electrode active material with a solvent as well as a binder and a conductive agent, if necessary, the negative electrode collector is coated with the slurry, compressed, and then dried.

The negative electrode active material layer may have a porosity of 10% to 60%, particularly 20% to 40%, and more particularly 25% to 35%.

The negative electrode collector is generally formed to a thickness of 3 μm to 500 μm. The negative electrode collector is not particularly limited as long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, similar to a positive electrode collector, microscopic irregularities may be formed on the surface of the collector to improve the adhesion of the negative electrode active material, and the negative electrode collector may be used in various shapes such as a film, a sheet, a foil, a net, a porous body, a foam body, a non-woven fabric body, and the like.

In step (2), a coating layer comprising lithium metal and metal oxide is formed on the negative electrode active material layer formed in step (1).

In the method of preparing the negative electrode for a lithium secondary battery according to an embodiment of the present invention, the forming of the coating layer in step (2) may be performed by depositing a mixture of the lithium metal and the metal oxide on the negative electrode active material layer.

As described above, in a case in which the forming of the coating layer in step (2) is performed by a method of depositing the mixture of the lithium metal and the metal oxide on the negative electrode active material layer, a coating layer, as a single layer in which the lithium metal and the metal oxide are mixed, may be formed.

The deposition may be performed by physical vapor deposition (PVD) comprising sputtering, E-Beam evaporation, or thermal evaporation, or chemical vapor deposition (CVD).

In a case in which the coating layer is formed by the deposition, the coating layer may be more easily adjusted to have an appropriate thickness.

In the method of preparing the negative electrode for a lithium secondary battery according to another embodiment of the present invention, the forming of the coating layer in step (2) may comprise the steps of forming a first layer comprising the lithium metal on the negative electrode active material layer and forming a second layer comprising the metal oxide on the first layer.

In a case in which the forming of the coating layer in step (2) is performed by a method of forming the first layer comprising lithium metal on the negative electrode active material layer and forming the second layer comprising metal oxide on the first layer, a coating layer in a form, in which the second layer comprising metal oxide is laminated on the first layer comprising lithium metal, may be formed.

The forming of the first layer may be performed by physical vapor deposition (PVD) comprising sputtering, E-Beam evaporation, or thermal evaporation, or chemical vapor deposition (CVD).

Also, the forming of the second layer may be performed by drop coating, physical vapor deposition (PVD), chemical vapor deposition, melting coating, electrodynamic coating, electrospraying, electrospinning, or dip coating.

Any binder and conductive agent typically used in the art may be used as the binder and the conductive agent used in the negative electrode.

An organic solvent, such as N-methylpyrrolidone (NMP), dimethylformamide (DMF), acetone, and dimethylacetamide, or water may be used as the solvent used for forming the negative electrode. These solvents may be used alone or in a mixture of two or more thereof. An amount of the solvent used will be sufficient so long as the solvent may dissolve and disperse the negative electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with lithium (Li), sodium (Na), or calcium (Ca), or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

According to an embodiment of the present invention, the negative electrode may further comprise a thickener for viscosity control. The thickener may be a cellulose-based compound, and, for example, the thickener may comprise at least one selected from the group consisting of carboxymethyl cellulose (CMC), hydroxy methyl cellulose, hydroxy ethyl cellulose, and hydroxy propyl cellulose, and may particularly comprise CMC. The negative electrode active material and binder as well as the thickener may be dispersed in water to be used in the negative electrode.

The present invention provides a lithium secondary battery comprising the negative electrode for a lithium secondary battery.

The lithium secondary battery may comprise the negative electrode, a positive electrode, and a separator disposed between the positive electrode and the negative electrode.

The positive electrode may be prepared by a typical method known in the art. For example, a binder, a conductive agent, and a dispersant, if necessary, as well as a solvent are mixed with a positive electrode active material and stirred to prepare a slurry, a metal current collector is then coated with the slurry and pressed, and the positive electrode may then be prepared by drying the coated metal current collector.

The metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 μm to 500 μm.

In the method of preparing a lithium secondary battery of the present invention, examples of the positive electrode active material may be lithium cobalt oxide ($LiCoO_2$); lithium nickel oxide ($LiNiO_2$); $Li[Ni_aCo_bMn_cM^1_d]O_2$ (where $M^1$ is at least one element selected from the group consisting of aluminum (Al), gallium (Ga), and indium (In), $0.3 \leq a < 1.0$, $0 \leq b \leq 0.5$, $0 \leq c \leq 0.5$, $0 \leq d \leq 0.1$, and $a+b+c+d=1$); a layered compound, such as Li ($Li_eM^2_{f-e-f'}M^3_{f'})O_{2-g}A_g$ (where $0 \leq e \leq 0.2$, $0.6 \leq f \leq 1$, $0 \leq f' \leq 0.2$, $0 \leq g \leq 0.2$, $M^2$ comprises manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \leq h \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \leq i \leq 0.3$); lithium manganese composite oxide represented by the chemical formula $LiMn_{2-j}M^5_jO_2$ (where $M^5$=Co, Ni, Fe, Cr, Zn, or tantalum (Ta), and $0.01 \leq j \leq 0.1$) or $Li_2Mn_3M^6O_8$ (where $M^6$=Fe, Co, Ni, Cu, or Zn); $LiMn_2O_4$ having a part of Li being substituted with alkaline earth metal ions; a disulfide compound; $LiFe_3O_4$, or $Fe_2(MoO_4)_3$, but the positive electrode active material is not limited thereto.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used will be sufficient so long as the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with Li, Na, or Ca, or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

An aqueous dispersant or an organic dispersant, such as N-methyl-2-pyrrolidone, may be used as the dispersant.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may comprise an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery, but the present invention is not limited thereto.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells.

MODE FOR CARRYING OUT THE INVENTION

Examples

Hereinafter, the present invention will be described in detail, according to examples and experimental examples, but the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1

Preparation of Negative Electrode

A negative electrode mixture slurry was prepared by adding 92 wt % of SiO, as a negative electrode active material, wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

A coating layer was formed on the above-prepared negative electrode by physical vapor deposition. For the deposition, 90 parts by weight of lithium metal and 10 parts by weight of $Al_2O_3$, as raw materials, were put in a thermal evaporator (Sunic System Co., Ltd.) and a coating layer comprising lithium metal and $Al_2O_3$ was deposited to a thickness of 5 μm on the SiO electrode by thermal evaporation.

Preparation of Lithium Secondary Battery

A Li metal foil (150 μm) was used as a counter electrode, a polyolefin separator was disposed between the negative electrode and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Example 2

Preparation of Negative Electrode and Lithium Secondary Battery

A negative electrode and a coin-type half cell was prepared in the same manner as in Example 1 except that the lithium metal and the $Al_2O_3$ were respectively used in amounts of 95 parts by weight and 5 parts by weight in the preparation of the negative electrode in Example 1.

Example 3

Preparation of Negative Electrode

A negative electrode mixture slurry was prepared by adding 92 wt % of SiO, as a negative electrode active material, 3 wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

A lithium metal layer was formed to a thickness of 5 μm on the negative electrode active material layer of the above-prepared negative electrode by applying a power of 100 W for 2 hours using a sputter.

An $Al_2O_3$ layer was formed on the lithium metal layer by physical vapor deposition (PVD). For the deposition, $Al_2O_3$, as a raw material, was put in a thermal evaporator (Sunic System Co., Ltd.) and preparation of a negative electrode having a coating layer formed thereon was completed by depositing $Al_2O_3$ to a thickness of 10 nm on the lithium metal layer through thermal evaporation.

Preparation of Lithium Secondary Battery

A coin-type half cell was prepared in the same manner as in Example 1 except that the above-prepared negative electrode was used.

Example 4

Preparation of Negative Electrode and Lithium Secondary Battery

A negative electrode and a coin-type half cell was prepared in the same manner as in Example 3 except that an $Al_2O_3$ layer was formed to a thickness of 50 nm.

Comparative Example 1

Preparation of Negative Electrode

A negative electrode mixture slurry was prepared by adding 92 wt % of SiO, as a negative electrode active material, wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

Preparation of Lithium Secondary Battery

A coin-type half cell was prepared in the same manner as in Example 1 except that the above-prepared negative electrode was used.

Comparative Example 2

Preparation of Negative Electrode

For deposition, lithium metal, as a raw material, was put in a thermal evaporator (Sunic System Co., Ltd.) and preparation of a negative electrode having a coating layer formed thereon was completed by depositing the lithium metal to a thickness of 5 μm on the negative electrode active material layer of the negative electrode of Comparative Example 1 through thermal evaporation.

Preparation of Lithium Secondary Battery

A coin-type half cell was prepared in the same manner as in Example 1 except that the above-prepared negative electrode was used.

Experimental Example 1: First Cycle Charge/Discharge Reversibility Test

Charge/discharge reversibility test was performed on the coin-type half cells prepared in Examples 1 to 4 and Comparative Examples 1 and 2 using an electrochemical charger/discharger. The coin-type half cells were charged by applying a current at a current density of 0.1 C-rate to a voltage of 0.005 V (vs. Li/Li$^+$) during first cycle charge and discharged at the same current density to a voltage of 1.5 V (vs. Li/Li$^+$) during discharge. In this case, charge capacity and discharge capacity were measured and a ratio (discharge capacity/charge capacity×100) was calculated and summarized.

TABLE 1

| | First charge and discharge efficiency (%) |
|---|---|
| Example 1 | 95 |
| Example 2 | 98 |
| Example 3 | 96 |
| Example 4 | 97 |
| Comparative Example 1 | 73 |
| Comparative Example 2 | 87 |

Referring to Table 1, it may be confirmed that the batteries of Examples 1 to 4 and Comparative Example 2 had improved reversibility in comparison to the battery of Comparative Example 1. The reason for this is that, with respect to the batteries of Examples 1 to 4 and Comparative Example 2, the lithium metal included in the coating layer formed on the negative electrode active material layer was reacted with SiO to cause a side reaction on the surface of the negative electrode active material in advance and the volume change generated during charge and discharge was experienced in advance to form dead-Li due to the volume expansion in advance. That is, it is considered that, since an amount of lithium actually consumed in the side reaction during the first charge was reduced by allowing the negative electrode active material to experience the side reaction in advance, almost all lithium ions intercalated during subsequent charge were reversibly released.

It may be confirmed that the batteries of Examples 1 to 4 had more improved reversibility than the battery of Comparative Example 2. In the coating layers of the batteries of Examples 1 to 4, since Al$_2$O$_3$ was mixed with the lithium metal or was formed on the lithium metal layer, the oxidation of the lithium metal by oxygen in air may be suppressed. Thus, it is considered that the amount of the lithium metal was not consumed while the lithium metal to be reacted with SiO in advance was stabilized, and, as a result, the reversibility was improved in comparison to Comparative Example 2 in which only lithium was deposited.

The invention claimed is:

1. A negative electrode for a lithium secondary battery, comprising:
    a negative electrode active material layer formed on a negative electrode collector; and
    a coating layer formed on the negative electrode active material layer and which comprises lithium metal and metal oxide,
    wherein the coating layer comprises a first layer comprising the lithium metal formed on the negative electrode active material layer and a second layer comprising the metal oxide formed on the first layer,
    wherein the metal oxide comprises at least one selected from the group consisting of titanium oxide, aluminum oxide, chromium trioxide, zinc oxide, copper oxide, magnesium oxide, zirconium dioxide, molybdenum trioxide, vanadium pentoxide, niobium pentoxide, iron oxide, manganese oxide, vanadium oxide, cobalt oxide, nickel oxide, and tantalum pentoxide,
    wherein the negative electrode active material layer comprises at least one selected from the group consisting of silicon (Si), silicon oxide particles (SiO$_x$, 0<x≤2), a Si-metal alloy, and an alloy of Si and silicon oxide particles (SiO$_x$, 0<x≤2), and
    wherein the second layer has a thickness of 10 nm to 50 nm.

2. The negative electrode for a lithium secondary battery of claim 1,
    wherein the first layer has a thickness of 1,000 nm to 7,000 nm.

3. A method of preparing the negative electrode for a lithium secondary battery of claim 1, the method comprising steps of:
    (1) forming the negative electrode active material layer on the negative electrode current collector; and
    (2) forming the coating layer comprising lithium metal and metal oxide on the negative electrode active material layer,
    wherein the forming of the coating layer in step (2) comprises forming the first layer comprising the lithium metal on the negative electrode active material layer and forming the second layer comprising the metal oxide on the first layer.

4. The method of claim 3, wherein the forming of the first layer is performed by physical vapor deposition (PVD) comprising sputtering, E-Beam evaporation, or thermal evaporation, or chemical vapor deposition (CVD), and
    the forming of the second layer is performed by drop coating, physical vapor deposition (PVD), chemical vapor deposition, melting coating, electrodynamic coating, electrospraying, electrospinning, or dip coating.

5. A lithium secondary battery comprising the negative electrode for a lithium secondary battery of claim 1.

* * * * *